US008362300B2

(12) United States Patent
Pritschins et al.

(10) Patent No.: US 8,362,300 B2
(45) Date of Patent: Jan. 29, 2013

(54) ADDITION COMPOUNDS SUITABLE AS DISPERSANTS AND DISPERSION STABILIZERS

(75) Inventors: Wolfgang Pritschins, Wesel (DE); Udo Krappe, Emmerich (DE); Karlheinz Haubennestel, Wesel (DE); Andrea Esser, Wesel (DE)

(73) Assignee: BYK-Chemie GmbH (DE)

( * ) Notice: Subject to any disclaimer, the term of this patent is extended or adjusted under 35 U.S.C. 154(b) by 152 days.

(21) Appl. No.: 11/123,804

(22) Filed: May 6, 2005

(65) Prior Publication Data

US 2005/0250927 A1 Nov. 10, 2005

(30) Foreign Application Priority Data

May 7, 2004 (DE) .................. 10 2004 022 753

(51) Int. Cl.
*C07C 275/62* (2006.01)
*C07C 275/02* (2006.01)
*C07C 273/00* (2006.01)
*C07C 273/02* (2006.01)
*C08G 18/79* (2006.01)

(52) U.S. Cl. ............... 564/38; 528/28; 528/49; 528/73; 560/25; 560/26; 560/27; 560/29; 560/33; 560/115; 560/158; 560/159; 560/160; 560/165; 560/166

(58) Field of Classification Search ............... 524/315, 524/361, 376, 507, 589, 590; 528/68, 49, 528/61, 62, 63, 64, 28, 73; 564/38; 560/25, 560/26, 27, 29, 33, 115, 158, 159, 160, 165, 560/166

See application file for complete search history.

(56) References Cited

U.S. PATENT DOCUMENTS

| | | | | |
|---|---|---|---|---|
| 2,957,852 A | * | 10/1960 | Frankenburg et al. | 528/59 |
| 3,489,744 A | * | 1/1970 | Brindell et. al. | 540/202 |
| 3,793,238 A | * | 2/1974 | Winkelmann et al. | 264/216 |
| 3,998,794 A | * | 12/1976 | Muller et al. | 528/67 |
| 4,042,413 A | | 8/1977 | Hauxwell et al. | |
| 4,044,171 A | * | 8/1977 | Muller et al. | 427/485 |
| 4,157,266 A | | 6/1979 | Hauxwell et al. | |
| 4,163,749 A | | 8/1979 | Hauxwell et al. | |
| 4,166,066 A | | 8/1979 | Hauxwell et al. | |
| 4,451,656 A | | 5/1984 | Dietz et al. | |
| 4,647,647 A | | 3/1987 | Haubennestel et al. | |
| 4,735,984 A | | 4/1988 | Gouji et al. | |
| 4,762,752 A | | 8/1988 | Haubennestel et al. | |
| 4,795,796 A | | 1/1989 | Haubennestel et al. | |
| 5,399,294 A | | 3/1995 | Quednau | |
| 5,425,900 A | | 6/1995 | Quednau | |
| 5,756,637 A | * | 5/1998 | Brodt et al. | 528/71 |
| 5,852,111 A | | 12/1998 | Watanabe et al. | |
| 5,861,193 A | | 1/1999 | Goldstein et al. | |
| 5,910,556 A | | 6/1999 | Wamprecht et al. | |
| 6,384,175 B1 | | 5/2002 | Danielmeier et al. | |
| 6,451,963 B1 | * | 9/2002 | Langel et al. | 528/480 |
| 2007/0225451 A1 | | 9/2007 | Haubennestel et al. | |
| 2007/0259120 A1 | | 11/2007 | Haubennestel et al. | |

FOREIGN PATENT DOCUMENTS

| | | |
|---|---|---|
| CA | 2581016 | 9/2007 |
| CN | 1312329 A | 9/2001 |
| CN | 1692975 A | 11/2005 |
| DE | 1051862 | 3/1959 |
| DE | 1110722 | 7/1961 |
| DE | 2310048 C2 | 9/1973 |
| DE | 3641581 C3 | 6/1988 |
| EP | 0074080 B1 | 3/1983 |
| EP | 0136411 A1 | 4/1985 |
| EP | 0154678 A1 | 9/1985 |
| EP | 0191915 A1 | 8/1986 |
| EP | 0292702 A1 | 11/1988 |
| EP | 0438836 A1 | 7/1991 |
| EP | 0826753 A1 | 3/1998 |
| EP | 1593700 A1 | 11/2005 |
| EP | 1710228 A2 | 10/2006 |
| EP | 1832573 A2 | 9/2007 |
| JP | 61176625 A | 8/1986 |

OTHER PUBLICATIONS

USDA Nutrient Database for Standard Reference, Release 11 (Sep. 1996)—Coconut Oil NDB No: 04047 http://www.netrition.com/oils/coconut.html.*
"Alipa—Polyisocyanates", www.alipa.org/78.0.html, Copyright 2005 by Alipa, Brussels, Belgium; 2 pages.
Woods, G., The ICI Polyurethanes Book, 2d Ed., John Wiley & Sons, Nov. 1990; ISBN-10: 0471926582; ISBN-13: 978-047196580; p. 30.
"European Patent Application No. 1832573, Derwent and Inpadoc patent family information", (Jan. 21, 2010), 23 pgs.
"U.S. Appl. No. 11/725,978, Response filed Oct. 7, 2011 to Non Final Office Action mailed Jul. 7, 2011", 19 pgs.
"U.S. Appl. No. 11/725,978, Advisory Action mailed Aug. 24, 2010", 5 pgs.
"U.S. Appl. No. 11/725,978, Final Office Action mailed Nov. 25, 2011", 9 pgs.
"U.S. Appl. No. 11/725,978, Non Final Office Action mailed Jul. 7, 2011", 15 pgs.
"U.S. Appl. No. 11/725,978, Response filed Dec. 13, 2010 to Advisory Action mailed Aug. 24, 2010", 13 pgs.

* cited by examiner

*Primary Examiner* — Rabon Sergent
(74) *Attorney, Agent, or Firm* — Schwegman Lundberg & Woessner, P.A.

(57) ABSTRACT

The present invention provides addition compounds, which suitable as dispersants and as dispersion stabilizers, and to the salts of the said compounds. The invention further provides processes for preparing these addition compounds, to their use as dispersants and dispersion stabilizers for organic and inorganic pigments and also fillers in organic and aqueous systems, and to pulverous or fibrous solids coated with such dispersants and intended for incorporation into liquid systems.

19 Claims, No Drawings

ADDITION COMPOUNDS SUITABLE AS DISPERSANTS AND DISPERSION STABILIZERS

RELATED APPLICATIONS

This application claims priority under 35 U.S.C. 119 to German Application No. 10 2004 022 753.5, filed May 7, 2004, which application is incorporated herein by reference and made a part hereof.

The present invention relates to addition compounds suitable as dispersants and as dispersion stabilizers, and to the salts of the said compounds. The invention further relates to processes for preparing these addition compounds, to their use as dispersants and dispersion stabilizers for organic and inorganic pigments and also fillers in organic and aqueous systems, and to pulverous or fibrous solids coated with such dispersants and intended for incorporation into liquid systems.

Dispersants are suitable in general for stabilizing particulate solids in binders, paints, pigment pastes, plastics and plastics blends, for reducing the viscosity of such systems, and for improving the flow properties.

In order to be able to incorporate solids into liquid media, high mechanical forces are necessary. It is usual to use dispersants in order to lower the dispersing forces and in order to minimize the total input into the system of energy needed to deflocculate the particulate solids, and hence also to minimize the dispersing time. Dispersants of this kind are surface-active substances of anionic, cationic or neutral structure. These substances, in a small amount, are either applied directly to the solid or added to the dispersing medium. It is also known that, following complete deflocculation of the agglomerated solids into primary particles, after the dispersing operation, there are also instances of reagglomeration, thereby completely or partly nullifying the dispersing effort. As a consequence of the inadequate dispersing and/or as a result of reagglomeration there are unwanted effects: viscosity increase in liquid systems, shade drift and losses of gloss in paints and coatings, and the reduction of mechanical strength in plastics.

A multiplicity of different substances are nowadays used as dispersants for pigments and fillers. Besides simple compounds of low molecular mass, such as lecithin, fatty acids and their salts, and alkylphenol ethoxylates, for example, complex structures, too, are used as dispersants. In particular, such structures include amino-functional and amide-functional systems, which find broad use within the dispersants. In EP 158 406 and EP 208 041 use is made, for example, for the purpose of dispersing pigments, of amino- and amide-functional poly- and oligopolymers based on polyamines and polycaprolactones, in which all the reactive amino groups have been converted into amide groups.

These products, however, constitute complex reaction mixtures which are difficult to reproduce and have very poor solubilities in solvents and inadequate compatibilities with binders and other resins. EP 0 713 894 describes the use of amino-functional polylactones for coatings and printing inks. Moreover, amine-functional polyacrylates (EP 0 311 157) are used for stabilizing organic and inorganic pigments.

Polymeric dispersants based on polyisocyanates are described for example in EP 0 154 678, EP 318 999 and EP 0 438 836. These products are prepared by addition reaction of monohydroxy compounds, diisocyanate-functional compounds and compounds having a tertiary amino group with the extant NCO groups of polyisocyanates containing isocyanurate, biuret, urethane and/or allophanate groups. Because of many possible side reactions in the course of their preparation, however, they constitute highly complex and poorly defined reaction mixtures, with the attendant disadvantages, such as greatly restricted compatibilities and poor solubilities. The reaction of the NCO groups with amine-containing compounds, in particular, represents a reaction step which is difficult to manage and which frequently leads to unwanted crosslinking and to formation of gel, since these crosslinking reactions are catalyzed by amines, especially tertiary amines. Consequently these reactions can be carried out only in highly dilute solutions, and the end products have very low solids contents, of generally below 50% and in many cases even only 20-30%. The large amounts of solvent that are introduced via these products, as a result, lead to considerable problems in modern coating systems, however, since, in the course of the progressing efforts to produce environmentally compatible systems, it is necessary to lower the amount of solvent as far as possible (in the case, for example, of pigment concentrates, high-solid and ultra-high-solid coating materials), or even to dispense with organic solvents entirely.

In addition the adsorption capacity of the monoamine addition compounds presented there on the solids' surfaces is in many cases insufficient for adequate stabilization of the solids. The selection of the amines that can be used for the preparation is limited to monoamines, since when polyamines are used the resulting products are impossible to handle, owing to crosslinking and gelling. The intermediates that are obtained according to these processes cannot be stored for prolonged periods, owing to the reactive NCO groups that are always still present, and must generally be reacted further immediately, so that the holding of precursors in stock, which is desirable from an economic viewpoint, is not possible.

The dispersants presented above often represent only partial solutions to these problems. In view of the multiplicity of organic and inorganic pigments and filling materials that are used today, sufficient stabilization of the particulate solids to be dispersed, by desorption-stable occupancy of the surface, is not adequately ensured. Consequently there are instances of agglomeration, since the efficient steric shielding that is necessary is lacking.

The present invention is therefore based on the object of eliminating the above-described disadvantages of known dispersants, in other words of developing dispersing additives which, while effectively stabilizing pigments or fillers, lower the millbase viscosity of the paints, pastes or plastics formulations to an extent such that processing with a high degree of filling is possible. At the same time, especially in the case of pigment pastes and filler pastes, a broad compatibility must be ensured, so that they can be used in many different binders and coating materials. Furthermore, it is necessary for the dispersing additives of the invention that are used to allow the pastes, or the binders prepared with these pastes, to be mixed with one another without flocculation.

Surprisingly it has become apparent that a marked improvement in the dispersing and stabilizing of pigments or filler particles in binders, pigment pastes or plastics formulations can be achieved if the addition compounds described below are used that are prepared from polyisocyanates containing uretdione groups.

These dispersants, furthermore, are of surprisingly broad compatibility and can be used both in polar and in apolar binder systems. They strongly lower the viscosity of the millbase during dispersing and so make it possible to prepare formulations having a high solids fraction.

It has surprisingly been found that the objective has been achieved through the provision of addition compounds which are obtainable by reacting
a) one or more polyisocyanates containing uretdione groups with
b) one or more compounds of the formula (I)

Y—(XH)$_n$           (I)

where
XH is a group that is reactive towards isocyanates and
Y is a monomeric or polymeric group that is not reactive towards isocyanates and which comprises one or more aliphatic, cycloaliphatic, araliphatic and/or aromatic groups,
Y possessing a number-average molar mass of less than 20 000 g/mol, and
n is 1, 2 or 3, and
for at least 50 mol % of the compounds of the formula (I) it is the case that n=1,
with the proviso that substantially all free isocyanate groups of component a) are reacted with the compounds of the formula (I) to give an intermediate which contains uretdione groups,
and subsequently the uretdione groups are reacted with
c) one or more compounds of the general formula (II)

Z—NHR           (II)

in which
R is hydrogen or a straight-chain or branched alkyl group having 1 to 4 carbon atoms and
Z is an aliphatic, cycloaliphatic and/or aromatic basic radical
and, if desired, after this reaction, reacting any reactive amino groups still present in the reaction product with compounds that are reactive towards amino groups. The addition compounds of the invention can also be used in the form of their salt formation products.

The addition compounds of the invention that are described here can be prepared targetedly and with fewer by-products than customary products known from the prior art, such as from EP 154 678, for example. The intermediates prepared according to reaction step a) to c) no longer contain free NCO groups and are therefore storage-stable for as long as desired, which makes more economic preparation possible. In particular the reaction with the amino-functional compounds Z—NHR proceeds without unwanted crosslinking, since in this case there are no free NCO groups present.

Polyisocyanates Containing Uretdione Groups (Component (a))

For the preparation of the addition compounds according to the invention use is made as uretdione-containing polyisocyanates (component a)) of the prior art compounds known in this technical field, as are described, for example, as starting compounds in EP 0 795 569. The preparation of these uretdione polyisocyanates is described for example in DE 1 670 720, EP 45 995, EP 99 976, EP 1 174 428 and the references cited therein. Preferably these polyisocyanates possess an average functionality of 2. With particular preference they include cyclic dimerization products of 1,4-diisocyanatobutane, hexamethylene diisocyanate (HDI), 2-methyl-1,5-diisocyanatopentane, 1,5-diisocyanato-2,2-dimethyl-pentane, 2,2,4- or 2,4,4-trimethyl-1,6-diisocyanato-hexane, 1,10-diisocyanatodecane, 1,3- and 1,4-diisocyanatocyclohexane, 1,3- and 1,4-bis(isocyanato-methyl)cyclohexane, 1-isocyanato-3,3,5-trimethyl-5-isocyanatomethylcyclohexane (isophorone diisocyanate, IPDI), 4,4'-diisocyanatodicyclohexylmethane, tolylene diisocyanate (TDI), 1-isocyanato-1-methyl-4(3)isocyanatomethylcyclohexane, bis(isocyanato-methyl)norbornane and 1,3- and 1,4-bis(2-isocyanatoprop-2-yl)benzene (TMXDI) or mixtures of such diisocyanates. Especially preferred starting compounds are hexamethylene diisocyanate (HDI), isophorone diisocyanate (IPDI) or tolylene diisocyanate (TDI).

These compounds are commercial products, which frequently are not present in pure form but instead represent the mixtures of compounds of similar structure. By average functionality is meant that in terms of isocyanate groups the commercial products have the stated functionality of 2. "Functionality of 2" means, for example, that one molecule contains on average 2 free isocyanate groups. The average functionality can be determined experimentally by determining the number-average molecular weight Mn. Additionally, the NCO number is determined and from this the NCO equivalent weight is calculated. The average functionality is the ratio formed from the number-average molecular weight and the NCO equivalent weight.

The polyisocyanates containing uretdione groups (component a)) are reacted in accordance with the invention with compounds of the above formula (I) (component b)).

Compounds of the Formula (I) (Component b))

The compounds of the formula (I) are characterized in that they contain one, two or three isocyanate-reactive groups XH. Examples of XH are —OH, —NH$_2$, —NHR, —SH or —COOH. Preferably XH is —OH, —NH$_2$ or —NHR. With particular preference these functional groups are hydroxyl groups, since those compounds are easily accessible and/or available commercially. The reaction products obtained are also usually highly soluble in solvents of the kind employed in the subsequent use of the dispersants according to the invention.

As compounds of the formula (I) it is possible to use aliphatic, cycloaliphatic, araliphatic and/or aromatic compounds. It is also possible to use mixtures of such compounds. Straight-chain and branched aliphatic or araliphatic compounds can be used. These compounds may be saturated or unsaturated. Saturated compounds are preferred. Some of the hydrogen atoms may have been replaced by halogen atoms, preferably by fluorine and/or chlorine.

Examples of compounds of the formula (I) are methanol, ethanol, butanol, ethylhexanol, decanol, isotridecyl alcohol, lauryl alcohol, stearyl alcohol, isobornyl alcohol, benzyl alcohol, propargyl alcohol, oleyl alcohol, linoleyl alcohol, oxo alcohols, neopentyl alcohol, cyclohexanol, fatty alcohols, alkylphenols, monophenyl diglycol, alkylnapthols and phenylethanol, and also monohydroxy-functional polybutadienes, polypropylenes or polystyrenes. Further examples are described inter alia in EP-A-154 678 (U.S. Pat. No. 4,647,647).

As compounds of the formula (I) it is also possible to use those which contain ester, ether, urethane, carbonate and/or siloxane groups or combinations of these groups. They may therefore, for example, be polyethers, polyesters, polyurethanes, polycarbonates, polysiloxanes, or, for example, mixed polyether-polyesters.

Polyesters can be prepared for example by reacting dicarboxylic acids, dicarboxylic anhydrides and/or dicarbonyl chlorides with diols and mono-, di- or tri-functional starter components. The formation of dihydroxy polyesters can be suppressed if required by using correspondingly stoichiometric amounts of monohydroxy compounds, as have been described above.

Preferably polyesters of the formula (I) are polyesters which can be obtained by polymerizing one or more, optionally alkyl-substituted, hydroxy carboxylic acids and/or lactones thereof such as propiolactone, valerolactone or caprolactone, for example, by means of a mono-, di- or tri-hydroxy starter component, as described in EP-A-154 678 (U.S. Pat. No. 4,647,647). Preferably they possess a number-average molecular weight Mn of 150 to 5000 g/mol. The mono-, di- or tri-functional alcohols used as starter components possess preferably 1 to 30, more preferably 4 to 14, carbon atoms. Mentioned by way of example are n-butanol, longer-chain, saturated and unsaturated alcohols, such as propargyl alcohol, oleyl alcohol, linoleyl alcohol, oxo alcohols, cyclohexanol, phenylethanol, neopentyl alcohol, ethylene glycol, propylene glycol, glycerol, and fluorinated alcohols. It is also possible to convert alcohols of the above-described kind and substituted and unsubstituted phenols, by alkoxylation in accordance with known processes, using ethylene oxide and/or propylene oxide, into polyoxyalkylene monoalkyl, polyoxyalkylene monoaryl, polyoxyalkylene monoaralkyl and polyoxyalkylene monocycloalkyl ethers and to use these hydroxy polyethers in the manner described above as starter components for the lactone polymerization. In each case it is also possible to use mixtures of aforementioned compounds. The lactone polymerization is carried out by known methods, initiated by p-toluenesulphonic acid or dibutyltin dilaurate, for example, at temperatures of about 70° C. to 180° C. Particular preference is given to ϵ-caprolactone-based polyesters, in combination if desired with δ-valerolactone.

As compounds of the formula (I) it is also possible to use mono-, di- or tri-hydroxy polyethers. These can be obtained, for example, by alkoxylating alkanols, cycloalkanols, phenols or the above-described hydroxy polyesters with alkylene oxides such as ethylene oxide, propylene oxide, butylene oxide or mixtures thereof. Mixed polyethers may be arranged randomly or in blocks. Preference is given to polyethers based on ethylene oxide, propylene oxide and mixtures thereof. These polyethers advantageously have a number-average molecular weight in the range from about 100 to 10 000 g/mol, preferably from 150 to 5000 g/mol and more preferably from 200 to 3500 g/mol.

As compounds of the formula (I) it is also possible to use polyurethanes, polyether-polyurethanes, polyester-polyurethanes and/or polyether-polyester-polyurethanes, which can be obtained by addition reaction of diisocyanates with dihydroxy compounds in the presence of mono-, di- or tri-functional starter components.

Preferred compounds of the formula (I) are hydroxy-functional polyethers, hydroxy-functional polyesters, hydroxy-functional polyether-polyesters and/or aliphatic and/or cycloaliphatic alcohols having 2 to 30 carbon atoms, some of whose hydrogen atoms may have been replaced by halogen and/or aryl radicals.

As diisocyanate it is possible to use the aliphatic, cycloaliphatic and/or aromatic diisocyanates known per se from polyurethane chemistry and having 4 to 15 carbon atoms, such as tetramethylene, hexamethylene, trimethylhexamethylene, dodecamethylene, isophorone, tolylene and diphenylmethane diisocyanates, methylene-bis(4-cyclohexyl isocyanate) or 1,4-cyclohexane-bis(methyl isocyanate). As hydroxy compounds for synthesizing the compounds of formula (I) that contain urethane groups it is appropriate to use diols having 2 to 12 carbon atoms, polyoxyalkylene glycols and dihydroxy-functional polyesters having preferred number-average molecular weights of not more than 2000 g/mol. As monohydroxy-functional starter component it is possible to use alcohols having up to 30 carbon atoms, such as are described for preparing the polyesters of formula (I), but also the hydroxy polyesters and hydroxy polyethers that are described as a compound of formula (I). The polyesters possess preferably a number-average molecular weight of 300 to 5000 g/mol, and the polyethers from 200 to 2000 g/mol.

The radical Y can contain carbonate groups such as are obtained by reaction with open-chain and/or cyclic carbonates in accordance with the prior art. Suitability is possessed for example by carbonate-modified linear polyesters or polycarbonate diols such as are used in preparing polyurethane. Examples are described in U.S. Pat. No. 4,101,529, EP 0 358 555, or WO 02/085507. Suitable carbonates are, for example, aliphatic, cycloaliphatic, araliphatic and/or aromatic esters of carbonic acid, such as dialkyl carbonates such as dimethyl carbonate, diethyl carbonate or diphenyl carbonate, for example, catechol carbonate or cyclic alkylene carbonates. Particular suitability is possessed by cyclic alkylene carbonates having 5- or 6-membered rings, which if desired may be substituted. Preferred substituents are aliphatic, cycloaliphatic and/or aromatic groups having up to 30 carbon atoms. Examples of suitable cyclic alkylene carbonates are ethylene carbonate, propylene carbonate, glyceryl carbonate, trimethylene carbonate, 4-methyltrimethylene carbonate, 5-methyltrimethylene carbonate, 5,5-dimethyltrimethylene carbonate, 5,5-diethyltrimethylene carbonate or 5-methyl-5-propyltrimethylene carbonate.

The radical Y may contain heteroatoms such as O, S and/or N and may carry further groups which behave inertly during the formation of the adduct. Examples of such groups include the carboxamide group (—NHCO—), unactivated double bonds or urea groups (—NHCONH—). The fraction of these groups should preferably be below 50 mol %, more preferably below 5 mol %. Particular preferred compounds are those containing none of these groups at all.

The ester, ether, urethane, carbonate and/or siloxane groups that may be present can be arranged in a block structure (e.g. poly(ethylene oxide-block-propylene oxide-block-ϵ-caprolactone) or else randomly.

As a compound of the formula (I) it is also possible to use polyacrylic esters and/or polymethacrylic esters having on average up to three NCO-reactive groups, such as are obtained by anionic, cationic or free-radical polymerization of acrylic esters and/or methacrylic esters. Preference is given to monohydroxy-functional compounds. Monohydroxy-functional polyacrylic esters and polymethacrylic esters are those containing on average one hydroxyl group in the molecule. Such compounds have already been used in the present field of the art for preparing other dispersants. Such compounds are described for example in U.S. Pat. No. 4,032,698 or EP 318 999. Such poly(meth)acrylates possess preferably a number-average molecular weight Mn of 300 to 20 000 g/mol, more preferably 500 to 10 000. They can be arranged in a block structure or else randomly. The carboxyl group of the monomeric (meth)acrylates (the term (meth)acrylates stands for acrylates and methacrylates) can be esterified with, for example, aliphatic, cycloaliphatic and/or aromatic alcohols such as methanol, butanol, cyclohexanol, 2-ethylhexanol, lauryl, stearyl, isobornyl or benzyl alcohol or with ether alcohols such as 2-methoxyethanol, 2-phenoxy-ethanol, tetrahydrofurfuryl alcohol, glycidol or with polyester alcohols such as hydroxyl-functional polycaprolactone, or with alkoxypolyalkylene glycols such as methoxypolyethylene glycol or methoxypoly-propylene glycol. The number-average molecular weight Mn of the esterification component is preferably below 2000 g/mol. For preparing the hydroxy-functional poly(meth)acrylates it is also possible to use mixtures of different monomers described above. For preparing these poly(meth)acrylates it is also possible as comonomers to use vinyl esters such as vinyl acetate, vinyl ethers such as vinyl ethyl ether, styrene, vinyl-toluene and/or vinylcyclohexane. The resulting copolymers advantageously do not contain more than 50 mol % of comonomers that have no acrylic functionality.

The number-average molecular weight of a radical Y is smaller than 20 000 g/mol and is preferably in the range from 100 to 10 000 g/mol, more preferably in the range from 150 to 5000 g/mol and very preferably in the range between 200 and 3500 g/mol.

Preference is given to addition compounds which are prepared with mixtures of different compounds of the formula (I), since these products are generally distinguished by a particularly broad compatibility.

Advantageously less than 25 mol % of the compounds used as monofunctional compounds (n=1) according to formula (I) possess a number-average molecular weight of less than 150 g/mol, preferably less than 15 mol % and more preferably 0 mol %.

In the reaction with the monofunctional compounds of the formula (I) 50 to 100 mol %, preferably 75 to 100 mol % and more preferably 100 mol % of the NCO groups originally used are reacted.

Examples of di- or trifunctional compounds of the formula (I) (n=2 or 3) are diols and triols and, respectively, diamines, dialkanolamines and mono-alkanolamines having 2 to 12 carbon atoms, dihydroxy-dialkyl sulphides and dihydroxy sulphones. Examples are butanediol, hexanediol, cyclohexanedimethanol, neopentyl glycol, ethylene glycol, alkyl-substituted dialkanolamines, glycerol, trimethylolpropane, fatty acid dialkanol amides, thiodiglycol, di(4-hydroxy-phenyl) sulphone, hydroxy-functional polybutadienes having an average functionality of 2 to 3. One preferred group of compounds of the formula (I) are polyoxyalkylene glycols advantageously having alkylene groups having 2 to 4, preferably 2, carbon atoms, and preferably having number-average molecular weights in the range from preferably 200 to 2000 g/mol and more preferably 400 to 1500 g/mol. Ethoxylates with 3 hydroxyl groups are obtained, for example, by polymerizing using trifunctional alcohols as a starter component. Preferred polyoxyalkylene glycols are polyethylene glycols.

As di- or tri-functional compounds of the formula (I) it is also possible to use those which can be obtained by polymerizing one or more lactones, as already mentioned, by means of di- or tri-hydroxy starter components. Preferably these polyesterpolyols have a number-average molecular weight Mn of 800 to 2000 g/mol. A preferred starter component is butanediol or ethylene glycol. It is also possible, however, for the abovementioned diols or triols to be suitable starter components.

As polyfunctional compounds of the formula (I) it is possible to use polyurethanes, polyether-polyurethanes, polyester-polyurethanes and/or polyether-polyester-polyurethanes, which can be obtained by addition reaction with a diisocyanate with a dihydroxy compound in analogy to the corresponding monofunctional compounds according to formula (I). Preferably these urethane-containing compounds according to formula (I) have an average functionality of not more than 2 and a number-average molecular weight of from 300 to 2500 g/mol, preferably of 500 to 1500 g/mol.

Other compounds of the formula (I) which can be used include polysiloxanes such as bis(hydroxyalkyl)poly-dialkylsiloxanes, preferably bis(hydroxyalkyl)poly-dimethylsiloxanes having number-average molecular weights Mn of preferably 400 to 2000 g/mol.

The di- or tri-functional compounds of the formula (I) produce crosslinking between the reaction products of polyisocyanate and monofunctional compounds of the formula (I). The starting products can be used for example in amounts such that the di- or trifunctional compounds of the formula (I) constitute the centre of the molecule, and such that attached to them are the polyisocyanates whose remaining isocyanate groups have been or are reacted with monofunctional compounds of the formula (I). It is of course also possible for a certain overcrosslinking or undercrosslinking to be present.

In the case of the reaction of the di- or tri-functional compounds of the formula (I) it is preferred to react 0% to 50% and preferably 0% to 25% of the NCO groups originally used. Particularly preferred products are obtained entirely without the use of di- or tri-functional compounds of the formula (I).

The reaction of the polyisocyanates with different compounds of the formula (I) can be carried out in one single reaction step or in two or more reaction steps in succession. This can take place in any order. In many cases, however, it is advantageous to react the polyisocyanate in succession with the components in the order first of monofunctional and then of polyfunctional compounds. The isocyanate addition can take place, depending on the reactivity of the individual reactants, within the temperature range that is customary for this kind of reaction, from room temperature up to about 150° C. For the purposes of acceleration and reduction of side reactions it is possible to use the customary prior art catalysts such as tertiary amines, for example triethylamine, dimethylcyclohexylamine, N-methylmorpholine, N,N'-dimethylpiperazine, 2-(dimethylaminoethoxy)ethanol, diazabicyclo[2.2.2] octane and similar compounds, and also, in particular, organometallic compounds such as titanic esters, iron compounds such as iron(III) acetylacetonate, for example, tin compounds, such as tin diacetate, tin dioctoate, tin dilaurate or the dialkyl derivatives of tin dialkyl salts of aliphatic carboxylic acids such as dibutyltin diacetate, dibutyltin dilaurate or the like, for example. These catalysts are customarily used in amounts of 0.0001 to 0.1 part by weight per 100 parts by weight of isocyanate.

Compounds of the Formula (II) (Component (c))

Reaction of the free NCO groups of the polyisocyanates containing uretdione groups with the compounds of the formula (I) is followed by the addition reaction of one or more compounds of the formula (II) Z—NHR, by way of the reactive amino group, with the uretdione groups. Preferably —NHR is —NH$_2$.

Depending on the reactivity of the compounds used this reaction is carried out preferably in a temperature range from about 20° C. to 200° C., more preferably from 60° C. to 150° C. The uretdione adduct is preferably added to the initial amine charge. The addition reaction can if desired be carried out in the presence of suitable catalysts, examples being amidines or Lewis acids. An overview of suitable catalysts is found for example in DE-19 856 878 and the references cited therein. Normally, however, it is unnecessary to use such catalysts.

One group of compounds which can be used as Z—NHR is composed of aliphatic diamines having a tertiary amino group and a primary or secondary amino group, such as 2-(diethylamino)ethylamine, 3-(dimethylamino)propylamine, 3-(diethylamino)propylamine, N,N-diethyl-1,4-butanediamine, and 1-diethylamino-4-aminopentane, of which 3-(dimethylamino)propylamine is preferred.

In the case of a further group, Z in formula (II) is a monocyclic or bicyclic heterocyclic group of which one ring nitrogen atom, preferably via an alkylene group having 2 to 5 carbon atoms, is attached to the group —NHR. Preferred heterocycles are triazole, pyrimidine, imidazole, pyridine, morpholine, pyrrolidine, piperazine, piperidine, benzimidazole, benzothiazole and/or triazine and more preferably imidazole and benzimidazole. These heterocycles may have one or more substituents. Preferably they carry one of the following groups: alkyl and/or alkoxy groups having 1 to 6 carbon atoms, preferably 1 to 4 carbon atoms, or amino groups. Among the alkoxy groups the methoxy group is preferred.

The abovementioned heterocycles can be linked directly to the —NHR group. Alternatively they can be connected by means of a group which is customary in this field, examples being alkylene groups having 2 to 10 carbon atoms, preferably 2 to 4 carbon atoms, or polyether groups with the same number of carbon atoms. The same applies to the tertiary amino group.

It is preferred for the heterocyclic groups to be attached to the group —NHR via a ring nitrogen atom and an alkylene group, preferably having 2 to 5 carbon atoms. The heterocyclic group may of course contain further heteroatoms besides this ring nitrogen atom, including further ring nitrogen atoms. These further ring nitrogen atoms may where appropriate also contain a hydrogen atom attached (such as in the case of N-alkylpiperazine, for example).

Alternatively the heterocyclic groups, as in the case of benzimidazole, can be attached to the group —NHR by means of a ring carbon atom, via an alkylene group where appropriate. The nature of the attachment depends essentially on the respective constitution of the heterocyclic groups and on the reactivities of the individual atoms, as is known to the skilled person.

In principle it is possible as compounds of the formula (II) to use those which have already been used in this field of the art for preparing other dispersants, as are described, for example, in U.S. Pat. No. 4,032,698. Examples of compounds of the formula (II) are N-(3-amino-propyl)imidazole, N-(3-aminopropyl)morpholine, N-(2-aminoethyl)piperidine, 1-methylpiperazine and amino-ethylpiperazine. Characteristics of these compounds are that they contain per molecule at least one amino group having at least one Zerewitinoff hydrogen atom, which reacts preferentially with the uretdione rings, and, moreover, that they possess a nitrogen-containing basic group without reactive hydrogen. These basic groups are also characterized in accordance with the prior art by their pKa value (cf. U.S. Pat. No. 3,817,944; U.S. Pat. No. 4,032,698 and U.S. Pat. No. 4,070,388). Preference is given to compounds having basic groups which possess a pKa of 2 to 14, more preferably 5 to 14 and very preferably 5 to 12. The pKa can be taken from tabular works. The limit values indicated above refer to the measurement of the pKa at 25° C. in a 0.01 molar concentration in water. These basic groups likewise give the addition compounds according to the invention a basicity of the kind also known in this technical field.

A further group of compounds which can be used as Z—NHR is composed of polyamines and/or polyimines, which where appropriate may be modified. Examples of these polyamine components are the following: aliphatic amines having at least three primary and/or secondary and/or tertiary amino groups. Aliphatic linear polyamines are suitable, such as diethylenetriamine (DETA), triethylenetetramine (TETA), tetraethylene-pentamine (TEPA), pentaethylenehexamine, hexaethylene-heptamine, and higher homologues, for example, higher linear condensates of the general formula $NH_2$—$(C_2H_4NH)_n$—$C_2H_4$—$NH_2$ with n>5, dipropylenetriamine, 3-(2-amino-ethyl)aminopropylamine, N,N-bis(3-aminopropyl)methyl-amine, tetramethyliminobispropylamine, N,N-dimethyl-dipropylenetriamine, bis(3-dimethylaminopropyl)amine and N,N'-bis(3-aminopropyl) ethylenediamine.

It is preferable to use aliphatic branched polyamines, especially poly($C_2$-$C_4$)alkylenamines, having primary, secondary and tertiary amino groups. Particular preference is given to the aziridine homopolymers which are also known under the name polyethylenimines, such as the Lupasol® grades from BASF or the Epomin® grades from Nippon Shokubai, for example. These are prepared by known methods, for example by the polymerization of ethylenimine. The ratio of primary to secondary to tertiary nitrogen atoms is preferably—as is usual in the case of the corresponding commercially customary products—approximately 1:2:1. Among these aliphatic branched polyamines preference is given to using types having an average molar mass of about 200-200 000 g/mol (Mw; measured by light scattering), more preferably types having an average Mw of about 300-40 000 g/mol. The protons on the nitrogen of these compounds can be replaced preferably by alkyl, aryl and/or aralkyl groups and/or be in quaternized form.

Besides the unmodified polyamines it is also possible to use partly modified polyamines, as described in EP 0 893 155, for the addition reaction. These modified polyamines can be, for example, condensates of the above-described polyamines with carboxylic acids such as stearic acid, oleic acid or tall oil fatty acid, for example, which are joined to the polyamine via amide groups. It is also possible to react parts of the primary or secondary polyamine with monoisocyanates such as stearyl isocyanate and/or polyisocyanates having n NCO groups, of which (n−1) NCO groups have reacted beforehand with other reactants. Advantageously not more than 50%, preferably not more than 20% and more preferably 0% of the reactive amino groups are reacted in this way prior to the uretdione addition. Reactive amino groups in this sense are primary or secondary amino groups.

A further suitable class of polyamines are homopolymers, copolymers or block copolymers having at least three primary or secondary amino groups, which either can be prepared by free-radical or ionic polymerizations or are formed by means of a polymer-analogous reaction on an existing polymer or are inserted into such a polymer. Homopolymers, copolymers or block copolymers of this kind possess a number-average molecular weight of up to 1 000 000 g/mol, preferably of 600 to 200 000 g/mol. Said polyamines can be used individually or in a mixture.

The products which are obtained following the addition reaction of the polyamines/polyimines may also contain reactive amino groups, which allow further modifications, in order to permit further-improved adaptation to the systems that are to be employed. Thus it is possible to react the polyamines/polyimines, before or after the uretdione addition, with epoxy-functional compounds, carbonates, carboxylic acids and/or $\alpha,\beta$-unsaturated compounds, or to allow two or more of the above-described reactions to proceed. Suitable epoxy-functional substances are for example aliphatic, cycloaliphatic and/or aromatic glycidyl ethers such as, for example, $C_1$-$C_{20}$ alkyl glycidyl ethers, phenyl glycidyl ether, cresyl glycidyl ether, naphthyl glycidyl ether, butyl glycidyl ether, p-tert-butylphenyl glycidyl ether, 2-ethylhexyl glycidyl ether, $C_{12}$-$C_{14}$ glycidyl ethers, allyl glycidyl ether, 2,3-epoxypropyl neodecanoate (Cardura® E10, Resolution Performance Products) or bisphenol A-based epoxides (Epikote grades). Monofunctional epoxides are preferred.

Suitable carbonates are aliphatic, cycloaliphatic and/or aromatic carbonic esters such as, for example, dialkyl carbonates such as dimethyl carbonate, diethyl carbonate or diphenyl carbonate, catechol carbonate or cyclic alkylene carbonates. Particularly suitable are cyclic alkylene carbonates having 5- or 6-membered rings, which where appropriate may be substituted. Preferred substituents are aliphatic, cycloaliphatic and/or aromatic groups having up to 30 carbon atoms. Examples of suitable cyclic alkylene carbonates are ethylene carbonate, propylene carbonate, glyceryl carbonate, trimethylene carbonate, 4-methyltrimethylene carbonate, 5-methyltrimethylene carbonate, 5,5-dimethyltrimethylene carbonate, 5,5-diethyltrimethylene carbonate or 5-methyl-5-propyltrimethylene carbonate.

Suitable carboxylic acids and carboxylic anhydrides are aliphatic, cycloaliphatic and/or aromatic carboxylic acids and their anhydrides such as, for example, acetic acid, propionic acid, benzoic acid, nitrobenzoic acid, acetic anhydride, succinic anhydride, maleic anhydride, phthalic anhydride, tetrahydrophthalic anhydride, alkyltetrahydrophthalic anhydride, hexahydrophthalic anhydride, alkylhexahydrophthalic anhydride, trimellitic anhydride, alkenyl- and/or alkyl-succinic anhydride having preferably from 1 to 20 carbon atoms in the alkenyl or alkyl chains.

One particularly preferred embodiment is represented by addition products which are formed by reacting vinylogous compounds with primary and secondary amino groups still present in the polyamines, in the manner of a Michael reaction. The advantage of the Michael reaction is that there is no change in the number of the amino groups in the polyamines during the reaction. All amino groups continue to be available for adsorption to the surface of the solid. As a vinylogous compound in the Michael reaction it is possible to use, for example, $\alpha,\beta$-unsaturated carbonyl compounds such as $\alpha,\beta$-unsaturated carboxylic esters or $\alpha, \beta$-unsaturated nitrites. Preferred embodiments of these Michael adducts are reaction products with acrylic and/or methacrylic esters having aliphatic, aromatic and/or aralkylic radicals, such as, for example, methyl (meth)acrylate, butyl (meth)acrylate, ethylhexyl (meth)acrylate, lauryl (meth)acrylate, stearyl (meth)acrylate, benzyl (meth)acrylate; ethoxylated and/or propoxylated (meth)acrylates and also hydroxy-functional (meth)acrylates such as hydroxyethyl (meth)acrylate and hydroxypropyl (meth)acrylate. Preferably the respective acrylic acid derivatives are reacted. Further suitable $\alpha,\beta$-unsaturated compounds are for example maleic anhydride, maleic esters and itaconic esters, such as diethyl maleate or dibutyl maleate, for example, and also $\alpha,\beta$-unsaturated phosphonic acids, such as vinylphosphonic acid, for example. In the case of the Michael adducts it is possible for about 5%-100% of the primary and secondary amino groups to have been subjected to this reaction. Preferably 15%-85%, more preferably 25%-75%, of the primary and secondary amino groups are reacted. Preferably 0.5 to 90 mol % (based on the primary and secondary amino groups) and more preferably 1 to 50 mol % of the primary and/or secondary amino groups are reacted after the uretdione addition with carboxylic acids, forming amide, with isocyanates, forming urea, and/or with epoxides, forming $\alpha$-amino-$\beta$-hydroxy compounds, and/or with $\alpha,\beta$-unsaturated compounds, in the manner of a Michael addition, or mixtures of the above reactants. If polyamines having more than three reactive amino groups are used as compounds of the formula (II) and are to be modified further following the uretdione addition, then less than 20 mol %, preferably less than 5 mol % and more preferably 0 mol % of the monofunctional compounds according to formula (I) ought to be composed of aromatic compounds having a number-average molecular weight of less than 200 g/mol, particularly if modification is carried out with alkyl acrylates.

For preparing the addition compounds of the invention it is also possible to use mixtures of different starting materials such as mixtures of uretdione-containing polyisocyanates and/or compounds according to formula (I) and/or (II).

Salt Formation Products of the Addition Compounds of the Invention

Through the basic groups the addition compounds are capable of salt formation. They can also be used for the purposes of the invention, as dispersants, in the form of such salts. In some cases it is possible by means of such salt formation, whether partial or complete, to obtain an improvement in the effectiveness and/or an improved solubility or compatibility. In applications in which the basicity of the products is a disruption, as well, such as in acid-catalyzed systems, for example, improvements can often be achieved by means of partial or complete neutralization.

These salts are obtained from the resultant reaction product by neutralization with one or more organic or inorganic acids or by quaternization with quaternizing agents, such as alkyl halides, for example, such as methyl iodide. The amount of acid to be used is guided by the field of use. Depending on each individual case, the acid components can be used equimolarly, in excess or in deficit. Preference is given to approximately equimolar neutralization. Preferred salts are those with organic monocarboxylic acids or acidic phosphoric esters. Examples of such acidic phosphoric esters are set out in EP 893 155, EP 417 490 and U.S. Pat. No. 5,143,952. Examples of carboxylic acids are aliphatic and/or aromatic carboxylic acids such as short-chain or long-chain fatty acids, formic acid, acetic acid, oleic acid, stearic acid, ricinoleic acid, natural saturated or unsaturated plant or animal fatty acids and their maleic anhydride adducts, tall oil fatty acid, dimerized or trimerized fatty acids, benzoic acid, citric acid and abietic acid.

The preparation of the addition compounds of the invention can be carried out, in analogy to the prior art, according to viscosity, in bulk or in the presence of suitable solvents, solvent mixtures or other suitable carrier media. Suitable solvents or carrier media are all those which are not reactive or whose reactivity towards the reactants is negligible and in which the reactants and the reaction products are at least partly soluble, examples being hydrocarbons such as toluene, xylene, aliphatic and/or cycloaliphatic benzine fractions, chlorinated hydrocarbons such as chloroform, trichloroethane, cyclic and acyclic ethers such as dioxane, tetrahydrofuran, polyalkylene glycol dialkyl ethers, esters such as ethyl acetate, butyl acetate, butyrolactone, phthalates or other plasticizers, di- or polycarboxylic esters, dialkyl esters of $C_2$ to $C_4$ dicarboxylic acids, referred to as "Dibasic Ester", alkyl glycol esters such as ethyl glycol acetate, methoxypropyl acetate, ketones such as methyl isobutyl ketone, cyclohexanone, acetone, acid amides such as dimethylformamide, N-methylpyrrolidone, and so on. The solvent or solvents and/or carrier media are advantageously selected to take account of the planned field of use. For example, for addition compounds of the invention for use in water-thinnable coating systems, or for coating pigments in aqueous suspension following the pigment synthesis, it is advantageous to use solvents which are totally or partly water-dilutable. Where the products are to be used, for example, in applications where the presence of VOCs (volatile organic compounds) is unwanted, the formulation should as far as possible be solvent-free or take place in appropriately high-boiling carrier media.

Depending on the field of application it is possible for the solvents used for the synthesis to remain in the reaction mixture, or they are fully or partly removed and, where appropriate, replaced by other solvents or carrier media. Depending on compatibility the addition compounds of the invention can also be combined with resins, resin solutions, reactive diluents, binders or other prior art additives, such as other wetting agents and dispersants, anti-settling agents, surface-active additives such as silicones, for example, and so on.

The solvent can be removed, for example, by distillation, where appropriate under reduced pressure, and/or azeotropically with the addition of water, such removal being complete or partial. Alternatively the active substance can be isolated by precipitation, by the addition of non-solvents such as aliphatic hydrocarbons, hexane for example, subsequent separation by filtration, and drying if desired. The active substance obtained by one of these methods can then be diluted in a solvent suitable for the particular field of application, or where appropriate can be used as it is, in the case of powder coating materials for example. If desired, following the addition of suitable high-boiling solvents, the solvent in which the addition product is dissolved can be distilled off, where appropriate under reduced pressure, and/or azeotropically with addition of water. In this way the addition product can be transferred to a carrier medium that is suitable for the respective field of application.

The reactions can be carried out in the presence of customary catalysts, examples being organotin compounds, such as dibutyltin dilaurate, other organometallic compounds such as iron acetylacetonate, tertiary amines such as triethylenediamine, enzymes or the like.

By varying the substituents of the formula (I), the portions and/or molecular weights thereof, it is possible to adjust the compatibility of the addition compounds of the invention in line with a very wide variety of solvents, carrier media, binders, resins, solids and, where appropriate, further polymeric compounds that are present in coating and moulding materials in which the addition compounds according to the invention are employed.

For use in highly polar systems such as water-based coating materials and electrocoats, for example, the radicals Y ought to include a sufficiently high fraction of polar groups, such as polyethylene oxides, for example, in order to achieve a level of water solubility which is sufficient for the particular area of use. This fraction of hydrophilic groups ought also not to be too high, however, if in certain applications this results in an unwanted increase in the sensitivity to water.

In the case of use in apolar systems such as long-oil alkyd paints, PVC plastisols or polyolefins there should be an appropriate fraction of apolar groups, and in the case of use in systems where broad compatibility is important, such as pigment concentrates, for example, a balanced combination of polar and apolar groups is of advantage.

If the addition compounds are used, for example, in a polyurethane resin or in a coating material whose binder is a polyurethane it is advantageous to use those addition compounds of the invention whose molecule, by virtue of the groups present in the starting compounds of the formula (I), also includes urethane groups or similar groups which, as is known to the skilled person, are compatible with polyurethanes. The same applies, mutatis mutandis, to, for example, polyacrylates, polyesters, alkyd resins, etc.

Mutatis mutandis this also applies to the substituents of the formula (II), which exert particular influence over the affinity of the addition compounds of the invention for the solids used that are to be dispersed.

The invention also provides a process for preparing the addition compounds of the invention, which involves (A) reacting
  (a) one or more polyisocyanates containing uretdione groups with
  (b) one or more compounds of the formula (I)

$$Y-(XH)_n \qquad (I)$$

where
  XH is a group that is reactive towards isocyanates and
  Y is a monomeric or polymeric group that is not reactive towards isocyanates and which comprises one or more aliphatic, cycloaliphatic, araliphatic and/or aromatic groups,
  Y possessing a number-average molar mass of less than 20 000 g/mol, and
  n is 1, 2 or 3, and
  for at least 50 mol % of the compounds of the formula (I) it is the case that n=1,
  with the proviso that substantially all free isocyanate groups of component a) are reacted with the compounds of the formula (I) to give an intermediate which contains uretdione groups, (B) reacting the uretdione groups with
  (c) one or more compounds of the general formula (II)

$$Z-NHR \qquad (II)$$

in which
    R is hydrogen or a straight-chain or branched alkyl group having 1 to 4 carbon atoms and
    Z is an aliphatic, cycloaliphatic and/or aromatic basic radical (C) optionally reacting any reactive amino groups still present in the reaction product with compounds that are reactive towards amino groups, and (D) optionally reacting the addition compounds with organic or inorganic acids and/or quaternizing agents.

The invention further provides for the use of the above-described addition compounds of the invention as dispersants and as dispersion stabilizers.

The invention further provides pulverous or fibrous solids intended for incorporation into liquid systems and coated with these addition compounds as dispersants and as dispersion stabilizers.

The dispersants of the invention can be used in accordance with the prior art for known dispersants, using the dispersants according to the invention in place of their prior art counterparts. Thus, for example, they can be used in the preparation of pigment- and/or filler-containing paints, printing inks, pastes, pigment concentrates and/or moulding compositions. By way of example the dispersants can be used for preparing a pigmented paint, in which case a film-forming binder and/or solvents, pigments and, where appropriate, fillers, the dispersant, and customary auxiliaries are mixed. Examples of water-based coatings are cathodic or anodic electrocoats for car bodies, for example.

The dispersants of the invention are particularly suitable as well for preparing concentrates of solids, such as pigment concentrates, for example. For that purpose the compounds of the invention are initially introduced in a carrier medium such as organic solvents, plasticizers and/or water, and the solids to be dispersed are added with stirring. Additionally these concentrates may include binders and/or other auxiliaries. These concentrates of solids can then be incorporated into different binders such as, for example, alkyd resins, polyester resins, acrylate resins, polyurethane resins or epoxy resins. Pigments can also, however, be dispersed directly in the addition compounds of the invention, without solvent, and are then particularly suitable for pigmenting thermoplastic and thermoset polymer formulations.

The invention also provides, finally, for the use of such a dispersant for producing a pigmented coating on a substrate, the pigmented paint being applied to the substrate and the pigmented paint which has been applied to the substrate being baked or cured and/or crosslinked.

The dispersants can be used alone or together with customary prior art binders. For use in polyolefins, for example, it can be advantageous to use corresponding polyolefins of low molecular mass as carrier materials, together with the dispersant.

Another inventive use of the dispersants is in the preparation of dispersible solids in powder particle and/or fibre particle form, particularly of dispersible pigments or plastics fillers, the particles being coated with the dispersant. Coatings of this kind on organic and inorganic solids are performed in a known way, as described in EP-A-0 270 126, for example. In this case the solvent or emulsion medium can either be removed or remain in the mixture, with the formation of pastes. These pastes are customary commercial products and may additionally include binder fractions and also further auxiliaries and additives. Specifically in the case of the pigments it is possible for the pigment surface to be coated during or after the synthesis of the pigments, by the addition, for example, of the addition products of the invention to the pigment suspension or during or after the pigment finish. The pigments pretreated in this way are distinguished by greater ease of incorporation and also by improved viscosity, flocculation and gloss behaviour and by higher colour strength as compared with untreated pigments.

Besides the above-described application, as dispersants and/or coating materials for pulverous and fibrous solids, the dispersants of the invention can also be used as viscosity reducers and compatibilizers in synthetic resins or for improving the compatibility of mixtures of incompatible components, such as polymer mixtures, for example. Examples of such synthetic resins are those known as sheet moulding compounds (SMC) and bulk moulding compounds (BMC), which are composed of unsaturated polyester resins with high filler and fibre contents. Their preparation and processing are described by way of example in DE-A-36 43 007. One problem affecting SMC and BMC synthetic resin mixtures is that often polystyrene (PS) is added to the formulation in order to reduce contraction during the processing operation. PS is not compatible with the unsaturated polyester resins used, and separation of the components occurs. When PS-filled SMC or BMC mixtures are being used, the additives of the invention, by virtue of their good dispersing qualities, are able to bring about compatibilization between PS and unsaturated polyester resin, thereby increasing the storage stability and processing reliability of such mixtures.

A further example are incompatible polyol mixtures, polyisocyanate mixtures or polyol blowing agent mixtures used for polyurethane production. Through the addition compounds of the invention it is possible in many cases wholly or partly to prevent the separation problems which result from this incompatibility.

The dispersants of the invention are generally used in an amount of 0.5% to 100% by weight, based on the solid to be dispersed. In order to disperse specific solids, however, higher amounts of the dispersants may also be necessary.

The amount of dispersant is substantially dependent on the surface of the solid for dispersion that is to be coated. Carbon black, for example, requires substantially greater quantities of dispersant than, say, $TiO_2$.

Examples of pulverous or fibrous solids are those which have been coated with dispersants in the prior art, especially organic and inorganic pigments which are used in paints, coating materials, moulding compositions or other plastics, and organic or inorganic fillers which are used to fill or reinforce paints, coating materials, moulding compositions or other plastics. A subgroup of such fillers are fibres of organic and/or inorganic type which are likewise used as fillers or reinforcing substances.

Examples of pigments are mono-, di-, tri- and poly-azo pigments, oxazine, dioxazine and thiazine pigments, diketopyrrolopyrroles, phthalocyanines and other metal complex pigments, indigoid pigments, diphenylmethane, triarylmethane, xanthene, acridene, quinacridone and methine pigments, anthraquinone, pyranthrone, perylene and other polycyclic carbonyl pigments, inorganic pigments based on carbon black, graphite, titanium dioxide, zinc oxide, zinc sulphide, zinc phosphate, barium sulphate, lithopones, iron oxide, ultramarine, manganese phosphate, cobalt aluminate, cobalt stannate, cobalt zincate, antimony oxide, antimony sulphide, chromium oxide, zinc chromate, mixed metal oxides of nickel, titanium, zinc, manganese, cobalt, iron, chromium, antimony, magnesium, aluminium (for example nickel titanium yellow or chromium titanium yellow), magnetic pigments based on pure iron, iron oxides and chromium oxides or mixed oxides, metallic pigments such as aluminium bronzes, pearlescent pigments, and fluorescent and phosphorescent luminescent pigments.

Examples of pulverous or fibrous fillers are, for example, those composed of pulverous or fibrous particles of aluminium oxide, aluminium hydroxide, silicon dioxide, kieselguhr, silicious earth, quartz, silica gel, talc, kaolin, mica, perlite, feldspar, slate flour, calcium sulphate, barium sulphate, calcium carbonate, calcite, dolomite, glass or carbon. Further examples of pigments or fillers are found for example in EP-A-0 270 126.

Additionally it is also possible to disperse mineral fillers, such as calcium carbonate, calcium oxide, for example, and also flame retardants such as, for example, aluminium hydroxide or magnesium hydroxide. Matting agents such as silicas, for example, can likewise be dispersed and stabilized outstandingly.

EXAMPLES

In the text below the invention is illustrated by means of examples. In the case of substances lacking molecular uniformity the molecular weights indicated below represent average values of the numerical mean (which, moreover, applies to the entire description, unless otherwise noted). The molecular weights, and number-average molecular weights Mn, can be determined by standard methods, as for example by determining the OH number or the amine number, cryoscopically, or by gel permeation chromatography. Unless otherwise remarked, parts are parts by weight and percentages are percentages by weight. The free NCO content of the polyisocyanates employed and also the course of the NCO addition reactions are determined in accordance with EN ISO 9369 by reaction with butylamine and subsequent titration of the amine excess. These methods are also described in Saul Patai's "The Chemistry of Cyanates and their Thio derivates", Part 1, Chapter 5, 1977.

The hydroxyl-functional caprolactone polyesters are prepared as described for example in EP 158678.

Preparation of the Intermediates (=Products of the Reaction Between Uretdione-Containing Polyisocyanates and Compounds of the Formula (I))

Preparation of Intermediate I1 a) Caprolactone polyester (compound of the formula (I); average molecular weight Mn of 1200):

Under an inert atmosphere 20.1 parts of hexadecanol and 79.9 parts of ε-caprolactone are homogenized, 0.002 part of dibutyltin dilaurate is added and the mixture is heated to 160° C. It is stirred at this temperature until a solids content of 98% is reached. The resulting polyester has an OH number of 47.

b) Reaction of an aliphatic HDI uretdione with a)

22.9 parts of aliphatic HDI uretdione having an NCO content of 21.8% are stirred with 46.5 parts of the caprolactone polyester described under a), 9.2 parts of n-decanol and 21.4 parts of a monohydroxy-functional PO polyether (Mn=1100) at about 80° C., with the addition of 0.01 part of dibutyltin dilaurate, until all of the free NCO groups have reacted and the presence of NCO is no longer detectable.

General Preparation Instructions for the Intermediates:

The stated polyisocyanate is mixed with the components stated in the table below. The mixture is then heated to 80° C., 0.01% of dibutyltin dilaurate is added, and the mixture is stirred at 80° C. until the NCO content has fallen to <=0.1%.

Immediately after their preparation the intermediates thus obtained can be reacted further, as described below, with amino-functional compounds. Since they no longer contain any free NCO groups they are storage-stable and can therefore also be stored, instead of the direct further reaction, over any desired period of time, to be used later.

The polyesters are prepared as described under intermediate I1a).

The non-inventive intermediate I18 is not storage-stable and must therefore be processed further immediately following preparation.

MPEG 350, 500 or 750=Methoxypolyethylene glycol, average molecular weight Mn=350, 500 or 750 respectively
M500 CPE 900=ϵ-Caprolactone polyester prepared starting from MPEG 500, average molecular weight Mn 900
M350 CPE 700=ϵ-Caprolactone polyester prepared starting from MPEG 350, average molecular weight Mn 700
MPG-CPE 1200=Monohydroxy-functional ϵ-caprolactone polyester prepared starting from monophenyl glycol, average molecular weight Mn 1200
C10 CPE 700, 750, 1000, 1100=Monohydroxy-functional ϵ-caprolactone polyesters prepared starting from decanol, average molecular weight Mn 700, 750, 1000 or 1100 respectively
PEG 200, 600, 1000=Polyethylene glycol (dihydroxy-functional), average molecular weight Mn 200, 600 or 1000 respectively
EO/PO 1100=Monohydroxy-functional EO/PO polyether (EO:PO 1:1) prepared starting from butanol, average molecular weight Mn=1100
Jeffamin M 600=Monoamino-functional EO polyether, Mn=600

TABLE 1

Intermediates

| No. | Poly-isocyanate | Parts by weight | Component 1 Compound of the formula (I) | Parts by weight | Component 2 Compound of the formula (I) | Parts by weight | Component 3 Compound of formula (I) | Parts by weight | NCO conversion in % |
|---|---|---|---|---|---|---|---|---|---|
| I1 | P1 | 22.9 | C16 CPE 1200 | 46.5 | n-decanol | 9.2 | PO 1100 | 21.4 | 33/50/17 |
| I2 | P1 | 22.2 | M500 CPE 900 | 67.7 | Oleyl alcohol | 10.1 | | | 67/33/— |
| I3 | P1 | 20.3 | MPEG 500 | 12.9 | M350 CPE 700 | 36.0 | C16 CPE 1200 | 30.8 | 25/50/25 |
| I4 | P1 | 26.3 | MPG-CPE 1200 | 40.0 | MPEG 750 | 25.0 | Ethylhexanol | 8.7 | 25/25/50 |
| I5 | P2 | 18.2 | C10 start. Capapoly. M~700 | 58.8 | PO 1100 | 23.0 | | | 80/20/— |
| I6 | P2 | 31.1 | Oleyl alcohol | 24.1 | MPEG 500 | 44.8 | | | 50/50— |
| I7 | P3 | 22.0 | EO/PO 1100 | 78.0 | | | | | 100/—/— |
| I8 | P4 | 21.2 | C4 CPE 800 | 78.8 | | | | | 100/—/— |
| I9 | P1 | 47.7 | Butyl triglycol | 52.3 | | | | | 100/—/— |
| I10 | P1 | 17.9 | Hydroxyethyl-pyrrolidone | 2.6 | C16 CPE 1200 | 54.5 | PO 1100 | 25.0 | 25/50/25 |
| I11 | P1 | 19.8 | C10 CPE 1000 | 50.1 | PEG 600 | 30.1 | | | 50/50/— |
| I12 | P1 | 18.8 | EO/PO 1100 | 52.5 | Jeffamin M 600 | 28.7 | | | 50/50/— |
| I13 | P1 | 25.6 | Monophenyl glycol | 9.4 | PEG 1000 | 65.0 | | | 50/50/— |
| I14 | P1 | 20.8 | MPEG 750 | 79.2 | | | | | 100/—/— |
| I15 | P1 | 9.0 | C10 CVPE 2000 | 91.0 | | | | | 100/—/— |
| I16 | P1 | 6.2 | C10 CVPE 3000 | 93.8 | | | | | 100/—/— |
| I17 | P1 | 19.2 | C10 CPE 1100 | 59.9 | PO 1100 | 17.8 | Monophenyl glycol | 3.1 | 50/26/24 |
| I18* | P5 | 25.8 | C10 CPE 1100 | 17.8 | PO 1100 | 5.5 | Monophenyl glycol | 1.2 | 33/17/16 |
| I19 | P1 | 31.7 | C10 CPE 750 | 60.3 | PEG 200 | 8.0 | | | 50/50/— |

The asterisk "*" denotes a non-inventive comparative example

Key to Table 1:
P1=Aliphatic HDI uretdione having a free NCO content of 21.8%, e.g. Desmodur N3400, Bayer AG
P2=Aromatic TDI uretdione having a free NCO content of 24.0%, e.g. Thanecure T9, TSE Industries
P3=Aliphatic IPDI uretdione having a free NCO content of 13.5%, e.g. Crelan VP LS 2147, Bayer AG
P4=Aliphatic IPDI uretdione having a free NCO content of 19.5%, e.g. Crelan VP LS 2347, Bayer AG
P5=Aromatic TDI polyisocyanurate having a free NCO content of 8.0% as a 51% strength solution in butyl acetate, e.g. Desmodur IL, Bayer AG
C16 CPE 1200=Monohydroxy-functional ϵ-caprolactone polyester, prepared starting from hexadecanol, average molecular weight Mn 1200
PO 1100=Monohydroxy-functional PO polyether, average molecular weight Mn=1100
C4 CPE 800=Monohydroxy-functional polyester of ϵ-caprolactone and δ-valerolactone in a molar ratio of 3:1, prepared starting from isobutanol, average molecular weight Mn 800
C10 CPE 2000, 3000=Polyester of ϵ-caprolactone and δ-valerolactone in a molar ratio of 3:1, prepared starting from decanol, number-average molecular weight Mn 2000 or 3000 g/mol respectively In the case of I11 and I13 the PEG is used in excess, so that only approximately 50% of the OH groups present in the PEG are reacted with NCO.

Preparation Example 1 of the Inventive Compounds a) A reaction vessel with reflux condenser and stirrer is charged with 4.2 parts of polyethylenamine, Mn about 2000 (e.g. Epomin SP018, Nippon Shokubai) and this initial charge is heated to 90° C. As soon as this temperature has been reached 43.8 parts of the uretdione-containing precursor intermediate I1 are added. The reaction may be somewhat exothermic, but does not require cooling; the energy liberated is used to accelerate the reaction. At the temperature which is established the reaction mixture is stirred until the uretdione addition reaction is largely at an end. The reaction can be monitored from the amine number: about 27% of the amino groups present are reacted.

b) When the amine number has fallen to 63% of the original figure a further 25% of the original amino groups are reacted by adding 2 parts of ethylhexyl glycidyl ether and stirring for about one hour more, with the temperature maintained, until the epoxy groups have largely reacted. The progress of the reaction can be monitored by 1H NMR measurement. The product is subsequently diluted with 15 parts of 1,2-propylene glycol and 35 parts of PMA. The product thus obtained has a solids content of 50%.

General Preparation Instructions for the Preparation Examples Described in the Table Below:

The amine is introduced and the intermediate is added at 90° C. Depending on viscosity, the intermediate is for this purpose heated and/or, where appropriate, diluted in a fraction of the stated solvent. The reaction may be somewhat exothermic, but does not require cooling: the energy liberated is utilized to accelerate the reaction. The reaction mixture is stirred at the temperature which is established until, on the basis of the decrease in amine number, the uretdione addition reaction is largely at an end.

Thereafter either reaction is continued with the further addition components stated in the table, and subsequently, after about one hour's reaction time, dilution takes place with the stated solvent, or, if no further addition takes place, dilution is carried out directly with the stated solvent. This can be followed by cooling and discharge.

TABLE 2

Preparation examples

| No. | Intermediate No. | % by wt. of intermediate | Amine | % by wt. of amine | Addition reaction of | % by wt. | Solvent | % by wt. | Solids content % |
|---|---|---|---|---|---|---|---|---|---|
| 1 | I1 | 43.8 | PEI 2000 | 4.2 | Ethylhexyl glycidyl ether | 2.0 | 1,2PG/PMA 1:2 | 50.0 | 50.0 |
| 2 | I2 | 94.8 | PEI 300 | 4.3 | Acetic anhydride | 0.9 | | | 100.0 |
| 3 | I3 | 44.6 | PEI 300 | 3.7 | C13/15 allyl glycidyl ether | 1.7 | PMA | 50.0 | 50.0 |
| 4 | I3 | 43.9 | DMAPA | 6.1 | | | PMA | 50.0 | 50.0 |
| 5 | I4 | 43.9 | PEI 300 | 5.8 | Acetic anhydride | 0.3 | PMA/PM 1:1 | 50.0 | 50.0 |
| 6 | I2 | 47.3 | DMAPA | 2.7 | | | PMA | 50.0 | 50.0 |
| 7 | I9 | 38.1 | DMAPA | 1.9 | | | NMP | 60.0 | 40.0 |
| 8 | I5 | 47.2 | DMAPA | 1.3 | API | 1.6 | NMP/PMA 2:1 | 50.0 | 50.0 |
| 9 | I6 | 45.7 | PEI 300 | 3.7 | Butyl acrylate | 0.6 | NMP | 50.0 | 50.0 |
| 10 | I3 | 46.7 | DEAPA | 3.3 | | | PMA | 50.0 | 50.0 |
| 11 | I3 | 45.7 | PEI 25000/PEI 300 4:1 | 3.4 | Lauryl acrylate | 0.8 | PMA/BG 2:1 | 50.0 | 50.0 |
| 12 | I9 | 42.3 | PEI 1200 | 6.2 | Succinic anhydride | 1.6 | PMA | 50.0 | 50.0 |
| 13 | I6 | 39.4 | 2-(2-Amino-ethylamino)ethanol | 6.2 | Ethylhexyl glycidyl ether | 4.4 | PMA | 50.0 | 50.0 |
| 14 | I9 | 86.0 | Triethylene-tetramine | 7.7 | Lauryl acrylate | 6.3 | | | 100.0 |
| 15 | I10 | 76.5 | Diethylene-tetramine | 2.4 | Acetic anhydride | 1.1 | PMA | 20.0 | 80.0 |
| 16 | I4 | 91.2 | PEI 300 | 6 | Propylene carbonate | 2.8 | | | 100.0 |
| 17 | I11 | 47.6 | DMAPA | 2.4 | | | PMA/PM | 50.0 | 50.0 |
| 18 | I12 | 47.6 | DMAPA | 2.4 | | | PMA | 50.0 | 50.0 |
| 19 | I13 | 47.9 | PEI 300 | 4.6 | Ethylhexyl acrylate | 7.5 | PMA | 40.0 | 60.0 |
| 20 | I14 | 73.7 | PEI 300 | 3.1 | Maleic anhydride | 3.2 | PMA | 40.0 | 60.0 |
| 21 | I17 | 47.1 | API | 2.9 | | | PMA | 50.0 | 50.0 |
| 22* | I18 | 37.9 | API | 2.1 | | | PMA | 60.0 | 40.0 |
| 23 | I17 | 35.3 | PEI 1200 | 5.6 | C13/15 allyl glycidyl ether | 11.1 | PMA | 52.0 | 48.0 |
| 24 | I19 | 44.5 | DMAPA | 4.5 | | | PMA | 40.0 | 60.0 |
| 25 | I15 | 48.7 | PEI 1200 | 1.3 | | | PM/PMA 1:1 | 50.0 | 50.0 |
| 26 | I16 | 49.4 | PEI 300 | 0.6 | | | PM/PMA 1:1 | 50.0 | 50.0 |

Key to Table 2:
PEI 300=Polyethylenimine, Mn about 300, e.g. Epomin SP003, Nippon Shokubai
PEI 1200=Polyethylenimine, Mn about 1200, e.g. Epomin SP012, Nippon Shokubai
PEI 2000=Polyethylenimine, Mn about 2000, e.g. Epomin SP018, Nippon Shokubai
PEI 25000=Polyethylenimine, Mn about 25000, e.g. Lupasol WF, BASF AG
1,2PG=1,2-Propylene glycol
PM=1-Methoxypropan-2-ol
PMA=1-Methoxy-2-propyl acetate
NMP=N-Methylpyrrolidone
DMAPA=N,N-Dimethylaminopropylamine DEAPA=N,N-diethylaminopropylamine
API=1-(3-Aminopropyl)imidazole
"*": Example 22 is a non-inventive comparative example. For the preparation the stated components are stirred at 90° C. for one hour. Thereafter free NCO groups are no longer detectable.

When it was attempted to react the non-inventive intermediate I18 with one of the polyethylenimines indicated above, in the same way as for the other examples, the reaction mixtures underwent complete gelling, and so it was impossible to obtain a product amenable to handling.

Intermediate I20

150 g of polyglycol B 01/20 (polypropylene glycol prepared starting from butyl and having an OH number of 80 g KOH/g, Clariant) and 150 g of polyglycol B 01/20 (polypropylene glycol prepared starting from butyl and having an OH number of 32 g KOH/g, Clariant) are charged to a reaction vessel. The water content of the reaction mixture should not exceed 0.5%. 58.2 g of Desmodur 3400 are added to this mixture with stirring. After the reaction mixture has been heated to 80° C. 0.9 g of a 10% strength solution of DBTL in xylene is added as catalyst. The mixture is stirred at 80° C. until the NCO value is less than 0.1%.

General Preparation Instructions for Preparation Examples 27-36 Described in the Table Below:

The polyamine is charged to a reaction vessel, diluted where appropriate, depending on viscosity, in a suitable solvent, such as butyl glycol, for example, and heated to 80° C. At this temperature the intermediate is slowly added dropwise. Depending on the viscosity of the intermediate it is necessary either to heat it beforehand or to dilute it in a suitable solvent. The end of the dropwise addition is followed by stirring at 80° C. for about an hour until the calculated amine number is reached. The epoxide is then added in one portion to the reaction solution and this solution is heated to 140° C. The batch is stirred at this temperature until the epoxide has undergone complete reaction, which can be monitored, for example, via NMR measurements.

The reaction with acrylic esters is the same in principle. Here as well, after the uretdione reaction has ended, the acrylic ester is added in one portion to the reaction material. Further reaction takes place at 80° C. and can likewise be monitored using, for example, NMR measurements.

If the addition reaction is carried out of an epoxide and an acrylic ester it is sensible to react the acrylate first and the epoxide thereafter.

When an attempt was made to use the non-inventive intermediate 118 instead of 120 in the above preparation examples, the reaction mixtures underwent complete gelling, and so it was not possible to obtain a product amenable to handling.

Preparation Example 37

For the purpose of salt formation, 16.9 g. of tall oil fatty acid (acid number: 195 mg KOH/g) are added to 100 g of the addition product obtained according to example 4, and the mixture is stirred at 50° C. for 20 minutes. The resulting salt has an acid number of 28 mg KOH/g and an amine number of 28 mg KOH/g.

Use Examples

For the purpose of assessing the compounds of the invention, pigment concentrates were prepared on the basis of two different grinding resins. After 10 days of storage at 20° C. their viscosity was evaluated at different shear rates: the lower the viscosity, the more effective the dispersing operation. The grinding resin used was either Laropal A81 (aldehyde resin, BASF) or Paraloid DM 55 (acrylate resin, Rohm and Haas). The figures in the formulas below are in grams.

To prepare the pigment pastes, the raw materials indicated in the tables below are weighed out in succession into a 500 ml Dispermat pot, an equal amount of 2 mm glass beads is added, and then dispersion is carried out with a 40 mm Teflon disc at 40° C. In the case of the Kronos 2160 titanium dioxide the dispersing time is 30 minutes at 8000 rpm, for the Bayferrox 130M iron oxide 40 minutes at 8000 rpm, and for the Spezialschwarz 4 carbon black 60 minutes at 10 000 rpm. The dispersed pastes are sieved off through a paper sieve (mesh size 80 μm) and dispensed into glass bottles. With the addition compounds of the invention, fluid pigment pastes are obtained which have very good rheological properties.

The viscosities of the pigment pastes were measured at 20° C. using the Rheolab MC 10 (Physica/Pacer). Prior to the actual viscosity measurement the pigment pastes were subjected to brief initial shearing at 4500 s$^{-1}$. Delta E of the white reductions was determined in accordance with DIN 5033 using the TCS instrument from Byk-Gardner.

TABLE 3

| Example | g Polyamine | g Intermediate | g Epoxide | g Acrylic ester |
|---|---|---|---|---|
| 27 | 10 g Lupasol WF | 14 g 120 | 24 g Grilonit RV 1814 | |
| 28 | 10 g Lupasol WF | 14 g 120 | 24 g Cardura E 10 | |
| 29 | 10 g Lupasol WF | 14 g 120 | | 16 g Butyl acrylate |
| 30 | 10 g Lupasol WF | 14 g 120 | | 20 g Isobornyl acrylate |
| 31 | 10 g Epomin SP 006 | 14 g 120 | 24 g Grilonit RV 1814 | |
| 32 | 10 g Epomin SP 006 | 14 g 120 | 24 g Cardura E 10 | |
| 33 | 10 g Epomin SP 006 | 14 g 120 | | 16 g Butyl acrylate |
| 34 | 10 g Epomin SP 006 | 14 g 120 | | 20 g Isobornyl acrylate |
| 35 | 10 g Lupasol WF | 20 g 120 | 24 g Grilonit RV 1814 | 16 g Butyl acrylate |
| 36 | 10 g Epomin SP 006 | 20 g 120 | 24 g Grilonit RV 1814 | 20 g Butyl acrylate |

Key to Table 3:
Epomin SP 006 = Polyethylenimine, Mn about 600, Nippon Shokubai
Grilonit RV 1814 = C10–C16 alkyl glycidyl ether
Cardura E 10 = 2,3-Epoxypropyl neodecanoate Paste Formulas:
(Amounts in parts by weight)
A) Laropal A81 Pastes

|  | A1 130 M | A2 SS4 |
|---|---|---|
| Laropal A81 (65% in xylene/PMA 1:1) | 17 | 28 |
| PMA | 1.4 | 14.2 |
| Xylene | 6.3 | 20.1 |
| Dispersant from preparation example (40%)* | 15 | 17.7 |
| Aerosil 200 | 0.3 | — |
| Bayferrox 130 M | 60 | — |
| Spezialschwarz 4 | — | 20 |

B) Paraloid DM55 Paste

|  | B1 130M |
|---|---|
| Paraloid DM55 (60% in xylene/PMA 1:1) | 22 |
| PMA | 7.6 |
| Dispersion from preparation example (40%)* | 15 |
| Aerosil 200 | 0.4 |
| Bayferrox 130M | 60 |

*The products having a relatively high solids content were likewise diluted to 40% with PMA in order to ensure comparability.

Results

| Pigment paste | Preparation example | Paste viscosity in mPas at D [$s^{-1}$] | | |
|---|---|---|---|---|
|  |  | D = $10s^{-1}$ | D = $100s^{-1}$ | D = $1000s^{-1}$ |
| A1 Bayferrox 130M/ Laropal A81 | Example 21 | 454 | 197 | 164 |
|  | Example 22* | 762 | 325 | 271 |
|  | Example 23 | 291 | 272 | 240 |
| A2 Spezialschwarz 4/Laropal A81 | Example 21 | 118 | 58 | 44 |
|  | Example 22* | 145 | 89 | 75 |
|  | Example 23 | 93 | 61 | 52 |
| B1 Bayferrox 130M/ Paraloid DM 55 | Example 21 | 969 | 889 | 985 |
|  | Example 22* | 2231 | 1734 | 1669 |
|  | Example 23 | 1768 | 1574 | 1488 |

*Comparative example (using intermediate I18)

The pigment pastes prepared with the non-inventive comparative example 22 exhibit the highest viscosities particularly in the bottom shear range, at low speeds of rotation, on account of their propensity to flocculate.

These pigment pastes were used together with a white paste (for formulas see table below) based on the same dispersing resin for preparing white reductions of a variety of clear varnishes.

C) White Pastes

|  | C1 A 81 | C2 DM 55 |
|---|---|---|
| Laropal A81 (65% in xylene/PMA 1:1) | 20.6 | |
| Paraloid DM 55 (60% in xylene/PMA 1:1) | | 27 |
| PMA | 8.1 | 5.5 |
| Xylene | 8 | |
| Disperbyk 112 (BYK-Chemie) | 3 | 2.2 |
| Aerosil 200 | 0.3 | 0.3 |
| TiO2 Kronos 2160 | 60 | 65 |

D) White Reductions

|  | A81 pastes | | DM 55 paste |
|---|---|---|---|
| Clear varnish | 18.7 | 19.6 | 19.4 |
| White paste | 9.3 | 9.8 | 8.6 |
| 130M paste | 2 | — | 2 |
| Carbon black paste | — | 0.6 | — | shake for 10 min

The flocculation stability was assessed by carrying out rub-out tests. For these tests the paint is poured onto a glass plate at an inclination of approximately 80° and flashed off until shortly before the state of initial drying is reached and, using the finger, about ⅓ of the paint surface is rubbed out to constant colour. After the film has cured, the difference in colour strength both of the rubbed-out area and of the area not rubbed out is determined as the delta E value. The lower the delta E value, the more effectively the pigments are stabilized towards flocculation and separation phenomena.

Clear Varnishes:

E) Alkyd/Melamine Baking Varnish

Alftalat AC 451 70%/Maprenal MF 800

| Alftalat AC 451 70% | 63.5 |
|---|---|
| Maprenal MF 800, melamine | 20.2 |
| Butanol | 2 |
| Solvent naphtha | 13.8 |
| Byk 310 (BYK-Chemie) | 0.2 |
| Byk 066 (BYK-Chemie) | 0.3 | adjust to 25 seconds with xylene, flash off for 20 minutes
Baking: 30 min at 140° C.

2K Varnish Acrylic/Isocyanate

Macrynal SM 510/Desmodur N 3390

| Clear varnish | | Hardener solution | |
|---|---|---|---|
| Macrynal SM5120 (acrylate resin) | 75 | | |
| PMA | 5 | | |
| Solvent naphtha | 5 | | |
| Xylene | 6.4 | | |
| Butyl acetate | 8 | Desmodur N3390 (polyisocyanate, Bayer) | 50 |
| Byk 306 (BYK-Chemie) | 0.1 | Butyl acetate | 35 |
| Byk 066 (BYK-Chemie) | 0.5 | Xylene | 15 |

Clear varnish:hardener solution 2:1

Results of the Rub-Out Tests:

| Pigment paste | Preparation example | E) Alkyd/melamine Delta E | F) 2K Delta E |
|---|---|---|---|
| A1 | Example 21 | 1.3 | 1.6 |
| Bayferrox 130M/ Laropal A81 | Example 22* | 4.2 | 4.0 |
| | Example 23 | 0.4 | 0.8 |
| A2 | Example 21 | 0.5 | 0.4 |
| Spezialschwarz 4/ Laropal A81 | Example 22* | 2.2 | 2.2 |
| | Example 23 | 0.3 | 1.7 |
| B1 | Example 21 | 1.8 | 1.7 |
| Bayferrox 130M/ Paraloid DM 55 | Example 22* | 3.6 | 2.3 |
| | Example 23 | 0.2 | 0.4 |

*Comparative example (using intermediate I18)

The white reductions prepared with the non-inventive comparative example 22 show the greatest floating, owing to their propensity to flocculate.

The invention claimed is:
1. An addition compound prepared by:
(A) reacting
a) one or more polyisocyanates containing uretdione groups and free isocyanate groups with
b) one or more compounds of the formula (I)

$$Y-(XH)_n \qquad (I)$$

wherein
XH is a group that can react with isocyanates;
Y is a monomeric or polymeric group that is not reactive towards isocyanates, that comprises at least one aliphatic, cycloaliphatic, araliphatic or aromatic group, and has a number-average molar mass of less than 20 000 g/mol, and
n is 1, 2 or 3; and
wherein, thr at least 75 mol % of the compounds of the formula (I), n is 1;
with the proviso that the free isocyanate groups of component a) but not the uretdione groups are reacted with the compound(s) of the formula (I) to form an intermediate which contains the uretdione groups; and,
(B-1) subsequently reacting the uretdione groups of the intermediate with
one or more polyamines and/or polyimines selected from the group consisting of diethylenetriamine, triethylenetetramine, tetraethylenepentamine, pentaethylenehexamine, hexaethyleneheptamine, polyamines of the general formula $NH_2-(C_2H_4NH)_n-C_2H_4-NH_2$ with n greater than 5, dipropylenetriamine, 3-(2-aminoethyl)aminopropylamine, N,N-bis(3-amino-propyl)methylamine, tetramethyliminobispropylamine, N,N-dimethyldipropylenetriamine, bis(3-dimethylaminopropyl)amine, N,N'-bis(3-aminopropyl)ethylenediamine and aliphatic branched poly($C_2$-$C_4$)alkylenamines having primary, secondary, and tertiary amino groups;
wherein the amino groups in the polyamines and/or polyimines are reacted with epoxy-functional compounds, carbonates, carboxylic acids, carboxylic anhydrides and/or α,β-unsaturated compounds before the addition reaction with the uretdione;
such that the products which are obtained following the reaction of the polyamines and/or polyimines with epoxy-functional compounds, carbonates, carboxylic acids, carboxylic anhydrides and/or α,β-unsaturated compounds contain reactive amino groups; or (B-2) subsequently reacting the uretdione groups of the intermediate with
one or more polyamines and/or polyimines selected from the group consisting of diethylenetriamine, triethylenetetramine, tetraethylenepentamine, pentaethylenehexamine, hexaethyleneheptamine, polyamines of the general formula $NH_2-(C_2H_4NH)_n-C_2H_4-NH_2$ with n greater than 5, dipropylenetriamine, 3(2-aminoethyl)aminopropylamine, N,N-bis(3-amino-propyl)methylamine, tetramethylimino-bispropylamine, N,N-dimethyldipmpylenetriamine, bis(3-dimethylaminopropyl)amine, N,N'-bis(3-aminopropyl)ethylenediamine and aliphatic branched poly($C_2$-$C_4$)alkylenamines having primary, secondary, and tertiary amino groups;
such that the products which are obtained following the addition reaction of the polyamines and/or polyimines with the uretdione contain reactive amino groups; and
subsequently reacting amino groups remaining from the addition product of the polyamines and/or polyimines with the uretdiones with epoxy-functional compounds, carbonates, carboxylic acids, carboxylic anhydrides and/or α,β-unsaturated compounds.

2. The addition compound of claim 1, wherein Y optionally contains the heteroatoms O, S or N or ether, urethane, carbonate, siloxane or ester groups, and optionally halogen is substituted for hydrogen.

3. The addition compound of claim 1, wherein compounds of the formula (I) used are hydroxy-functional polyethers, hydroxy-functional polyesters; hydroxy-functional polyether-polyesters, or aliphatic or cycloaliphatic alcohols having 2 to 30 carbon atoms.

4. The addition compound of claim 3, wherein the polyisocyanates containing uretdione groups are cyclic dimerization products of hexamethylene diisocyanate, isophorone diisocyanate or tolylene diisocyanate.

5. The addition compound of claim 1 wherein XH is OH.
6. The addition compound of claim 1 wherein n is 1.
7. The addition compound of claim 1, wherein the compounds of formula (I) are chloro or aryl substituted hydroxy-functional polyethers, chloro or aryl substituted hydroxy-functional polyesters, chloro or an substituted hydroxy-functional polyether-polyesters, or chloro or aryl substituted or aliphatic or cycloaliphatic alcohols having 2 to 30 carbon atoms.

8. The addition compound of claim 1, wherein the polyamine is selected from aliphatic, branched poly($C_2$-$C_4$) alkylenamines, having primary, secondary and tertiary amino groups.

9. The addition compound of claim 8 wherein the aliphatic, branched poly($C_2$-$C_4$)alkylenamines, having primary, secondary and tertiary amino groups are selected from aziridine polymers.

10. A method for preparing a pigmented paint, wherein the paint comprises a mixture of one or more of a film-forming hinder, solvents, and pigments, fillers, and paint auxiliaries; which method comprises mixing an addition compound of claim 1 with the mixture.

11. A pigment- or filler-composition comprising pigment concentrates, paints, pastes moulding compositions or mixtures thereof; and an addition compound of claim 1.

12. A method for forming a pigmented coating on a substrate, comprising applying to the substrate, the pigmented paint prepared by the method of claim 10, and baking, curing or crosslinking the coating.

13. A method for forming a dispersible solid powder particle or fibre particle, comprising applying to the particle, an addition compound of claim 1, wherein the addition compound forms a coating on the particles.

14. A salt or a quaternization product of an addition compound of claim 1.

15. A process for preparing an addition compound of claim 1 comprising:
(A) reacting
(a) one or more polyisocyanates containing uretdione groups and free isocyanate groups with
(b) one or more compounds of the formula (I)

$$Y\text{—}(XH)_n \qquad (I)$$

wherein
XH is a group that can react with isocyanates;
Y is a monomeric or polymeric group that is not reactive towards isocyanates, that comprises at least one aliphatic, cycloaliphatic, araliphatic or aromatic group, and has a number-average molar mass of less than 20 000 g/mol, and
n is 1, 2 or 3; and,
wherein for at least 75 mol % of the compounds of the formula (I), n is 1;
with the proviso that the free isocyanate groups of component a) but not the uretdione groups are reacted with the compounds of the formula (I) to form an intermediate which contains the uretdione groups,
(B-1) reacting the uretdione groups of the intermediate with
one or more polyamines and/or polyimines selected from the group consisting of diethylenetriamine, triethylenetetramine, tetraethylenepentamine, pentaethylenehexamine, hexaethyleneheptamine, polyamines of the general formula $NH_2\text{—}(C_2H_4NH)_n\text{—}C_2H_4\text{—}NH_2$ with n greater than 5, dipropylenetriamine, 3-(2-aminoethyl)aminopropylamine, N,N-bis(3-amino-propyl)methylamine, tetramethyliminobispropylamine, N,N-dimethyldipropylenetriamine, bis(3-dimethylaminopropyl)amine, N,N'-bis(3-aminopropyl)ethylenediamine and aliphatic branched poly($C_2$-$C_4$)alkylenamines having primary, secondary, and tertiary amino groups;
wherein the amino groups in the polyamines and/or polyimines are reacted with epoxy-functional compounds, carbonates, carboxylic acids, carboxylic anhydrides and/or α,β-unsaturated compounds before the reaction with the uretdione;
such that the products which are obtained following the reaction of the polyamines and/or polyimines with epoxy-functional compounds, carbonates, carboxylic acids, carboxylic anhydrides and/or α,β-unsaturated compounds contain reactive amino groups;
(B-2) subsequently reacting the uretdione groups of the intermediate with one or more polyamines and/or polyimines selected from the group consisting of diethylenetriamine, triethylenetetramine, tetraethylenepentamine, pentaethylenehexamine, hexaethyleneheptamine, polyamines of the general formula $NH_2\text{—}(C_2H_4NH)_n\text{—}C_2H_4\text{—}NH_2$ with n greater than 5, dipropylenetriamine, 3-(2-aminoethyl)aminopropylamine, N,N-bis(3-aminopropyl)methylamine, tetramethyliminobispropylamine, N,N-dimethyldipropylenetriamine, bis(3-dimethylamino-propyl)amine, N,N'-bis(3-aminopropyl)ethylenediamine and aliphatic branched poly($C_2$-$C_4$)alkylenamines having primary, secondary, and tertiary amino groups;
such that the products which are obtained following the addition reaction of the polyamines and/or polyimines with the uretdione contain reactive amino groups; and
subsequently reacting amino groups in the addition product of the polyamines and/or polyimines with the uretdiones with epoxy-functional compounds, carbonates, carboxylic acids, carboxylic anhydrides and/or α,β-unsaturated compounds.

16. The process of claim 15 wherein the reaction product of step (B-1) or step (B-2) is converted to a sat or quaternization product by reaction with organic or inorganic acids or quaternizing agents.

17. The process of claim 15 wherein XH is OH.

18. The process of claim 15 wherein n is 1.

19. The process of claim 15 wherein XH is OH and n is 1.

* * * * *